United States Patent [19]

Gorney et al.

[11] Patent Number: 4,687,143

[45] Date of Patent: Aug. 18, 1987

[54] DRIP IRRIGATION APPARATUS

[75] Inventors: Moshe Gorney; Eldad Dinur, both of Kibbutz Naan, Israel

[73] Assignee: Naan Mechanical Works, Naan, Israel

[21] Appl. No.: 817,917

[22] Filed: Jan. 10, 1986

[30] Foreign Application Priority Data

Oct. 3, 1985 [IL] Israel .................................. 76553

[51] Int. Cl.⁴ ............................................. A01G 25/16
[52] U.S. Cl. ..................................................... 239/542
[58] Field of Search ................ 239/542, 547, 271, 272, 239/533.1, 570, 571

[56] References Cited

U.S. PATENT DOCUMENTS

| 3,954,223 | 5/1976 | Wichman et al. | 239/542 |
| 4,014,473 | 3/1977 | Rosenberg | 239/542 |
| 4,084,749 | 4/1978 | Drori | 239/547 |
| 4,161,291 | 7/1979 | Bentley | 239/542 |
| 4,193,545 | 3/1980 | Havens | 239/547 |
| 4,209,133 | 6/1980 | Mehoudar | 239/542 |
| 4,413,786 | 11/1983 | Mehoudar | 239/542 |
| 4,502,631 | 3/1985 | Christen | 239/542 |
| 4,519,546 | 5/1985 | Gorney et al. | 239/542 |
| 4,550,878 | 11/1985 | Rosenberg et al. | 239/542 |
| 4,573,640 | 3/1986 | Mehoudar | 239/542 |

Primary Examiner—Andres Kashnikow
Attorney, Agent, or Firm—Abelman Frayne Rezac & Schwab

[57] ABSTRACT

Pressure responsive, volume-controlled drip irrigation apparatus including a drip irrigation element defining a volume control region having a peripheral edge surface along at least part of the periphery thereof, there being disposed along a side of the volume control region a first surface of a flexible membrane, whose second surface communicates with a source of pressurized water, a flow restricting pathway having an inlet communicating with the source of pressurized water and an outlet communicating with the volume control region, and a water outlet communicating with the volume control region at the peripheral edge surface thereof.

12 Claims, 16 Drawing Figures

DRIP IRRIGATION APPARATUS

FIELD OF THE INVENTION

The present invention relates to drip irrigation apparatus generally and more particularly to pressure controlled drip irrigation apparatus.

BACKGROUND OF THE INVENTION

Various types of drip irrigation apparatus are known in the patent literature and in the marketplace. A particularly successful type of drip irrigation apparatus is described and claimed in Israel Pat. No. 45211 which discloses a drip irrigator comprising a continuous uninterrupted drip irrigation hose which is extruded around drip irrigation elements.

U.S. Pat. No. 4,519,546, which is assigned to the present assignee, describes a differential pressure responsive, volume-controlled drip irrigation apparatus which also employs a continuous uninterrupted drip irrigation hose.

U.S. Pat. No. 4,210,287 also described differential pressure responsive, volume-controlled drip irrigation apparatus employing a continuous outer hose. The apparatus described in the Mehoudar patent has the disadvantage that it is susceptible to blockage when water of at least a predetermined pressure is supplied thereto. In the apparatus described in the Mehoudar patent, the predetermined pressure at which blockage occurs decreases as the size of the outlet aperture is increased. However, a decrease in the size of the outlet aperture increases its susceptibility to clogging.

U.S. Pat. No. 4,095,745 described drip irrigation apparatus including flexible tubular outlet means in the form of flaps which protrude into the water flow stream and cause a pressure drop thereacross. The structure described therein is intended to provide flushing upon initial flow through the drip line and volume control thereafter, as the result of bending of the tubular outlet means.

U.S. Pat. No. 4,502,631 to Rainbird proposes drip irrigation apparatus having a narrowed outlet region underlying a flexible membrane, which is intended to prevent the membrane from completely blocking the outlet at high pressure. Other than this feature, the apparatus described in U.S. Pat. No. 4,502,631 is similar to that shown in U.S. Pat. No. 3,954,223 to the same assignee as U.S. Pat. No. 4,502,631.

SUMMARY OF THE INVENTION

The present invention seeks to provide pressure controlled drip irrigation apparatus which is resistant to blockage in response to an initial application of high pressure.

There is thus provided in accordance with a preferred embodiment of the present invention pressure responsive, volume-controlled drip irrigation apparatus including a drip irrigation element defining a volume control region having a peripheral edge surface along at least part of the periphery thereof, there being disposed along a side of the volume control region a first surface of a flexible membrane, whose second surface communicates with a source of pressurized water, a flow restricting pathway having an inlet communicating with the source of pressurized water and an outlet communicating with the volume control region, and a water outlet communicating with the volume control region at the peripheral edge surface thereof.

In accordance with one embodiment of the invention, the water outlet is formed in the peripheral edge surface. According to an alternative embodiment, the water outlet is formed adjacent the peripheral edge surface. As a further alternative embodiment, the water outlet may be formed partially in the peripheral edge surface.

Further in accordance with an embodiment of the present invention, the water outlet is located such that it cannot possibly be blocked by the flexible membrane when exposed to water pressures within the operating range of the drip irrigation apparatus, i.e. up to 6 ATM or more.

In accordance with a preferred embodiment of the invention, the volume control region defines a water pathway from the inlet thereto to the outlet therefrom which is not susceptible to blockage by the flexible membrane when exposed to water pressures within the operating range of the drip irrigation apparatus, i.e. up to 6 ATM or more.

In accordance with one embodiment of the present invention, the volume control region defines a channel extending generally but not necessarily completely between the water inlet to the volume control region and the water outlet therefrom.

In accordance with an alternative embodiment of the invention, the volume control region defines an elongate protrusion facing the flexible membrane and extending generally but not necessarily completely between the water inlet to the volume control region and the water outlet therefrom.

Further in accordance with a preferred embodiment of the present invention, the water outlet from the volume control region does not underlie the flexible membrane insofar as it bounds the volume control region.

Additionally in accordance with a preferred embdoiment of the invention, the water outlet from the volume control region does not lie within the peripheral bounds of the region but rather outside thereof.

Additionally in accordance with an embodiment of the present invention, the flow restricting pathway is operative to limit the volume of water passing through the apparatus at relatively low pressures. The combination of the flow restricting pathway followed by the volume control this is operative to limit the overall outflow rate of of a drip irrigation system comprising a multiplicity of drip irrigation devices connected in series. In this manner excessive outflow of a drip irrigation line and failure thereof to pressurize properly is prevented, without requiring oversupply of water upon initial pressurization as in prior art pressure responsive, volume-controlled systems.

Further in accordance with an embodiment of the present invention, the flow restricting pathway is opeative to significantly limit the flow through the dripper element only during initial water supply thereto at the beginning of an irrigation cycle. Therefore, partial clogging of the flow restricting pathway will not appreciably change the output flow rate of the dripper element during normal steady-state operation.

Additionally in accordance with an embodiment of the inventio, a side surface of the volume control region may be defined wholly or partially by the inner surface of the tube which surrounds the drip irrigation element. In such an embodiment, the flexible membrane may be formed integrally with the remainder of the drip irrigation element, either of a single material or by means of techniques which permit molding of multiple materials to form an integral product.

BRIEF DESCRIPTION OF THE DRAWING

The present invention will be understood and appreciated more fully from the following detailed description taken in conjunction with the drawings in which.

DETAILED DESCRIPTION OF A PREFERRED EMBODIMENT

Figure 2:
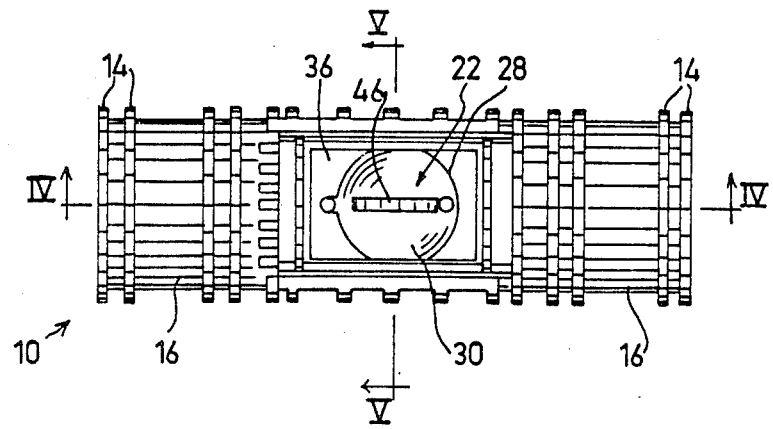
FIG. 2 is a plan view illustration of one side of a drip irrigation element forming part of the apparatus of FIG. 1, shown as molded.
Figure 3:
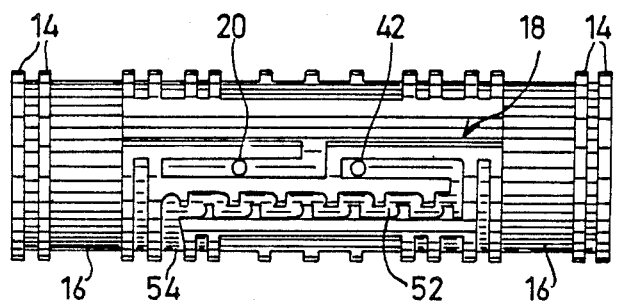
FIG. 3 is a plan view illustration of the opposite side of the drip irrigation element, one side of which is shown in FIG. 2.
Figure 1:
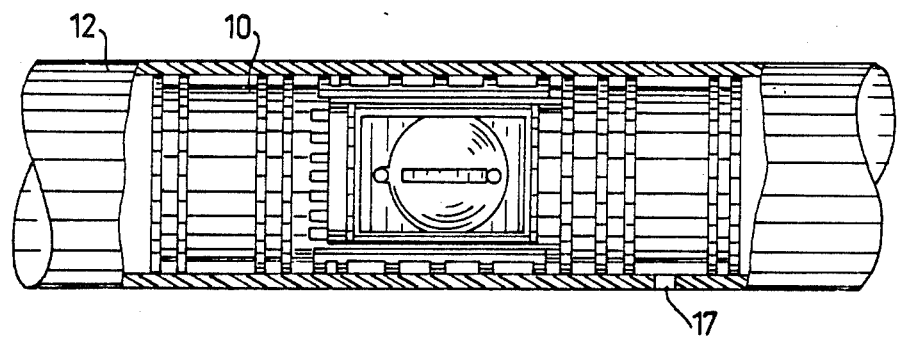
FIG. 1 is a partially cut away pictorial view of drip irrigation apparatus constructed and operative in accordance with a preferred embodiment of the present invention.
Figure 4:
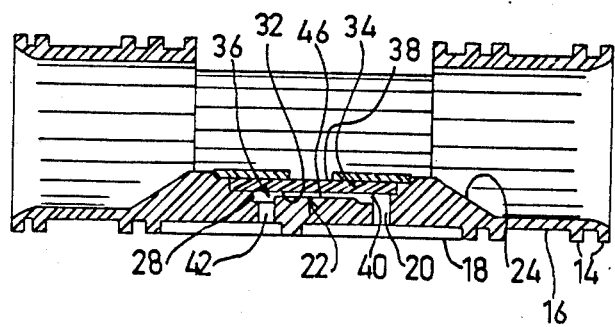
FIG. 4 is a sectioanl illustration of the apparatus of FIG. 2 taken along the lines IV—IV indicated in FIG. 2, shown as assembled.

Reference is now made to FIGS. 1–5B which illustrate one preferred embodiment of the present invention. A drip irrigation insert 10 is surrounded by an outer sleeve 12 which is preferably part of a continuous uninterrupted outer hose but alternatively may comprise a discrete member or be of any other suitable configuration.

The drip irrigation insert 10 is typically of generally cylindrical configuration and comprises a pair of concentric protruding engagement rings 14 adjacent to each axial end thereof. Disposed axially inwardly of rings 14 are a pair of water outlet regions 16 which are preferably of annular configuration and extend around the entire periphery of the cylindrical insert. Water outlet regions 16 are designed to communicate with the outside atmosphere by means of one or more perforations 17 formed in the sleeve 12 in the region thereof.

Water outlet regions 16 communicate, via water outlet conduits 18 with a water outlet 20 from a volume control region 22, one preferred embodiment of which is illustrated in detail in FIGS. 2–5B. Considering the embodiment of FIGS. 2–5B, it is seen that the volume control region 22 is formed in a recess defined in a thickened portion 24 of the insert 10.

It is seen that the volume control region is defined by a peripheral edge wall 28, which extends over most or all of the periphery of the region and is typically, but not necessarily, of circular bent disk-like configuration having one side defined by a wall 30 of the insert. The opposite side is defined by the inner facing surface 32 of a flexible membrane 34 which is sealingly seated in a recess 36 such that the opposite surface 38 of the flexible membrane is exposed to the line pressure at the interior of the drip insert 10. Alternatively, the volume control region may be bounded by a side wall defined wholly or partially by the inner surface of outer sleeve 12.

It is a particular feature of a preferred embodiment of the present invention that the outlet 20 is located outside of the volume control region 22 and communicates with the volume control region 22 via an aperture 40 in the peripheral edge wall 28 of the volume control region. Alternatively, the outlet 20 may be located adjacent to the peripheral edge wall or may be formed partially in the peripheral edge wall. This structure ensures that aperture 40 cannot be blocked by the flexible membrane even during initial pressurization of the line, within the range of operating pressures of the irrigation apparatus, i.e. up to 6 ATM or more.

It is also a particular feature of the present invention that a blockage resistant water pathway is defined extending from an inlet 42 to the volume control region 22 to outlet 20, whereby the flow of water through the pressure control enclosure cannot be entirely blocked by the flexible membrane under initial pressurization of the line or during normal operation with in the range of operating pressures of the irrigation apparatus, i.e. up to 6 ATM or more.

According to one embodiment of the invention, the inlet 42 is located at the peripheral edge wall 28 to prevent blockage thereof. Similarly to the water outlet 20, the water inlet 42 may be formed in the wholly or partially in the peripheral edge wall 28 or adjacent thereto.

The general principle of operation of the volume control region is that an inrease in line pressure increasingly forces the flexible membrane against wall 30 thereby decreasing the cross sectional area of the blockage resistant water pathway, thereby limiting the rate of flow of water therethrough from the inlet thereto to the outlet therefrom.

In the embodiment of FIGS. 2–5B, the blockage resistant water pathway is defined by an elongate protrusion 46, typically of height 0.25 mm, which extends axially from adjacent the inlet 42 to a location adjacent the outlet 20. This protrusion defines to one or both sides thereof a channel which cannot be blocked entirely by the flexible membrane within the range of operating pressures of the irrigation apparatus, as defined above.

Figure 5A:
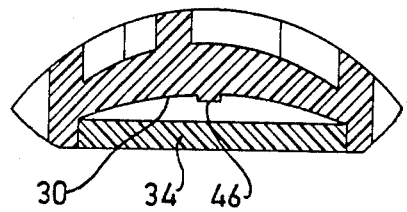
FIGS. 5A and 5B are sectional illustrations of the apparatus of FIG. 2 taken along the lines V—V inidcated in FIG. 2 in respective unpressurized and pressurized states.
Figure 5B:
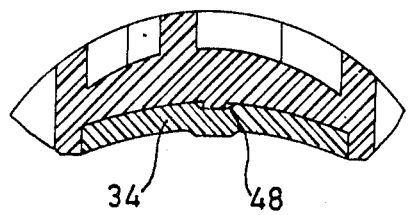
Figure 6:
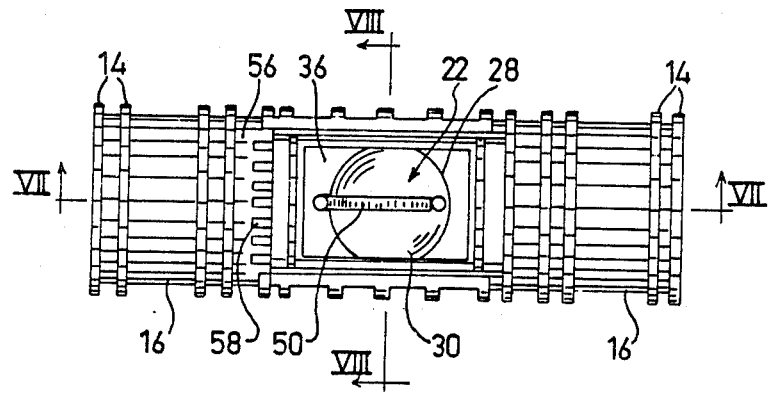
FIG. 6 is a plan view illustration of one side of a drip irrigation element forming part of the apparatus FIG. 1 which is constructed and operative according to an alternative embodiment of the invention, shown as molded.
Figure 7:
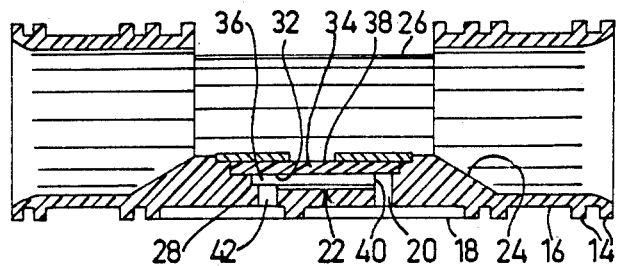
FIG. 7 is a sectional illustration of the apparatus of FIG. 6 taken along the lines VII—VII indicated in FIG. 6, shown as assembled.
Figure 8A:
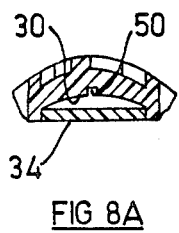
FIGS. 8A and 8B are sectional illustrations of the apparatus of FIG. 6 taken along the lines VIII—VIII inidcated in FIG. 6 inrespective unpressurized and pressurized states.
Figure 8B:
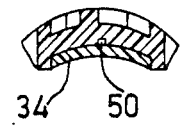

Referring now specifically to FIGS. 5A and 5B, there is shown in FIG. 5A, the orientation of flexible membrane 34 relative to protrusion 46 and wall 30 to enclosure 22 when the system is not pressurized. FIG. 5B illustrates the same structure when the system is pressurized. There is clearly seen in FIG. 5B defined between protrusion 46 and membrane 34 on both sides of the protrusion 46, an open channel 48.

According to an alternative embodiment of the present invention, as seen in FIGS. 3, 6–8B, the protrusion is replaced by a channel 50 formed in wall 30 and extending from the inlet to the outlet. The typical cross sectional area of channel 50 is 0.35×0.2 mm for rubber having a hardness of about 35–50 shore A.

Alternatively, a relatively wide channel may be employed, typically having dimensions of 2 mm×0.25 mm for the same rubber as above. It may be appreciated that the channel construction is immune to blockage as is the pathway defined by the protrusion, although the protrusion may have an advantage in being more resistant to clogging due to a buildup of particulate matter therein. The clogging problem is not believed to be significant due to the relatively high speed traversal of the channel 50 by the irrigation fluid.

The inlet 42 to the volume control region 22 communicates with the outlet of a flow reducing pathway 52 of conventional construction and whose inlet 54 communicates via a water inlet conduit 56 with water inlet apertures 58 communicating, in turn, with the interior of the drip irrigation insert at line pressure.

It is also a particular feature of the invention that the flow reducing pathway 52 acts during initial pressurization of the drip irrigation apparatus to limit the outflow at low inlet pressures thereto but has not effective role during normal operation at higher pressures. This is the case because the pressure reduction produced by the flow reducing pathway 52 is insignificant as compared with the pressure reduction produced by the blockage resistant pathway extending through enclosure 22. Accordingly partial clogging of the flow reducing pathway 52 does not appreciably vary the outflow rate of the drip irrigation apparatus.

Figure 9:
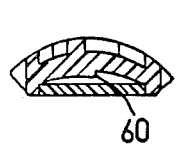
FIGS. 9 and 10 are sectioanl illustrations corresponding to FIG. 5A of two alternative embodiments of drip irrigation elements.
Figure 10:
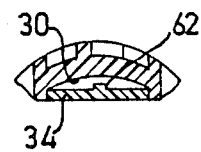
Figure 12:
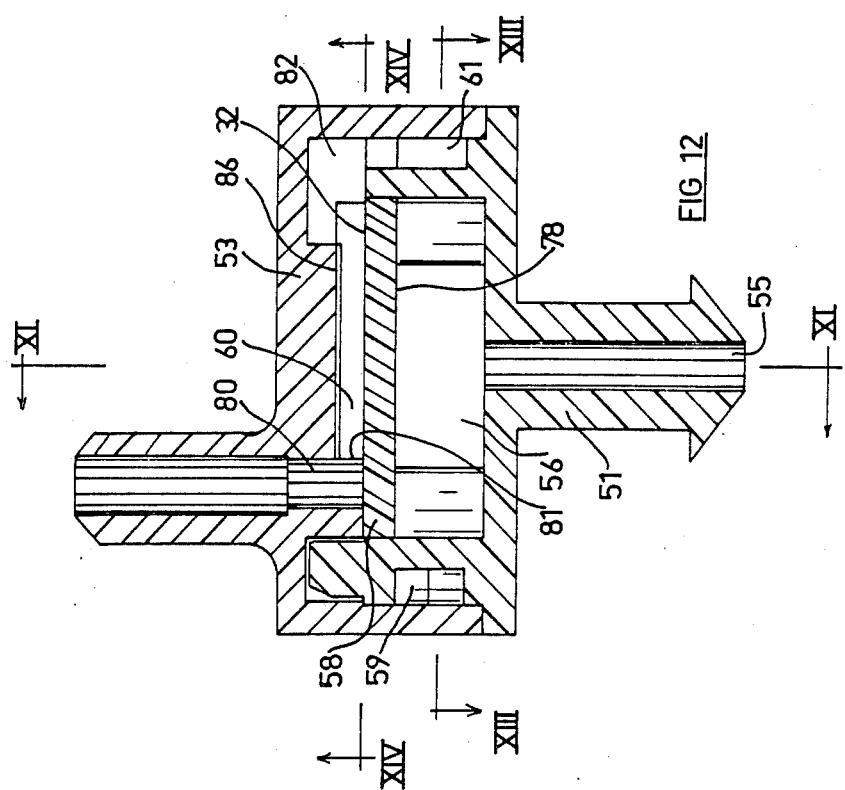
FIG. 12 is a sectional illustration of the branch dripper of FIG. 11, taken along the lines XII—XII shown in FIG. 11.
Figure 11:
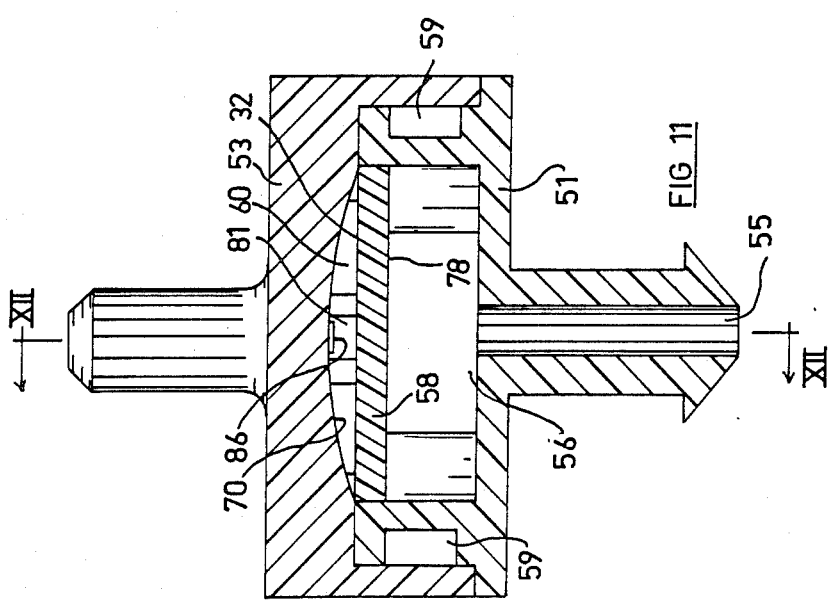
FIG. 11 is a sectional illustration of a branch dripper constructed and operative in accordance with an alternative embodiment of the present invention.
Figure 14:
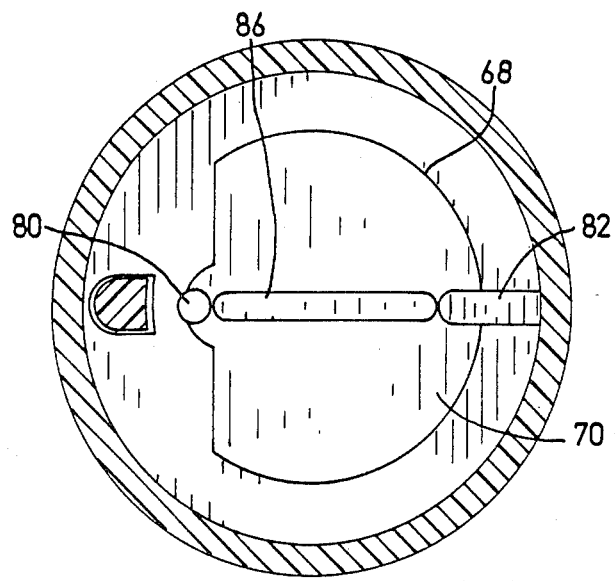
FIG. 14 is a sectional illustration of the branch dripper of FIGS. 11 and 12, taken along lines XIV—XIV shown in FIG. 12.
Figure 13:
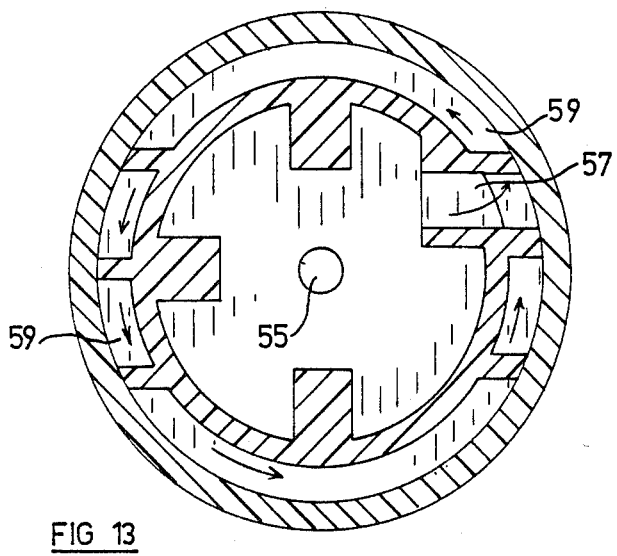
FIG. 13 is a sectional illustration of the branch dripper of FIGS. 11 and 12, taken along lines XIII—XIII shown in FIG. 12 and illustrating a water passageway.

Reference is now made to FIGS. 9 and 10. FIG. 9 shows an alternative embodiment of configuration of the blockage resistant pathway in the volume control enclosure. In the embodiment of FIG. 9, the pathway is defined by a step 60 formed in wall 30 of the enclosure 22. In the embodiment of FIG. 10, a protrusion 62 is defined on the flexible membrane 34, facing wall 30, rather than on the wall 30, as in the embodiment of FIGS. 5A and 5B.

Reference is now made to FIGS. 11–14 which illustrate a branch dripper constructed and operative in accordance with an embodiment of the invention. The branch dripper shown in FIGS. 11–13 comprises an inlet housing portion 51 and an outlet housing portion 53 which fit together, as by welded engagement, for example, to define an inlet conduit 55, leading to an inlet chamber 56.

The inlet chamber 56 is defined by the internal wall surfaces of inlet housing portion 50 and by a resilient flexible diaphragm 58 which is disposed between the internal wall surfaces of inlet housing portin 50 and of outlet housing portion 52. Diaphragm 58 may be securely and immovably mounted at its periphery or alternatively may be allowed to move. Diaphragm 58 sealingly separates the inlet chamber 56 from a volume control region 60.

Water from the inlet chamber 56 passes through an aperture 57 which leads to a flow reducing pathway 59 which is disposed in surrounding relationship to the inlet chamber 56 and is defined between adjacent surfaces of the inlet housing portion 51 and the outlet housing portion 53. The operation of flow reducing pathway 59 is similar in all relevant respects to that of flow reducing pathway 52 described hereinabove in connection with FIG. 3.

The water exiting from flow reducing pathway 59 is supplied via a conduit 61 to an inlet 82 to volume control region 60.

It is seen that the volume control region 60 is defined by a peripheral edge wall 68, which extends over most or all of the periphery of the region and is typically, but not necessarily, of circular bent disk-like configuration.

One side of volume control region 60 is defined by an inner wall surface 70. The opposite side is defined by the inner facing surface 72 of flexible membrane 58 which is preferably sealingly seated within inlet housing member 50 such that the opposite surface 78 of the flexible membrane is exposed to the line pressure at the interior of inlet chamber 56.

It is a particular feature of a preferred embodiment of the present invention that an outlet 80 is located outside of the volume control region 60 and communicates with the volume control region 60 via an aperture 81 in the peripheral edge wall 28 of the volume control region. Alternatively, the outlet 80 may be located adjacent to the peripheral edge wall or may be formed partially in the peripheral edge wall. This structure ensures that aperture 81 cannot be blocked by the flexible membrane even during initial pressurization of the line, within the range of operating pressures of the irrigation apparatus, i.e. up to 6 ATM or more.

It is also a particular feature of the present invention that a blockage resistant water pathway is defined extending from inlet 82 to the volume control region 60 to outlet 80, whereby the flow of water through the volume control region cannot be entirely blocked by the flexible membrane under initial pressurization of the line or during normal opeation within the range of operating pressures of the irrigation apparatus, i.e. up to 6 ATM or more.

According to one embodiment of the invention, the inlet 82 is located at the peripheral edge wall 68 to prevent blockage thereof. Similarly to the water outlet 80, the water inlet 82 may be formed in the wholly or partially in the peripheral edge wall 68 or adjustment thereto.

As in the embodiment of FIGS. 2–5B, the blockage resistant water pathway may be defined by an elongate protrusion 86, typically of height 0.25 mm, which extends axially from adjacent the inlet 82 to a location adjacent the outlet 80. This protrusion defines to one or both sides thereof a channel which cannot be blocked entirely by the flexible membrane within the range of operating pressures of the irrigation apparatus, as defined above.

The operation of the apparatus is substantially identical to that described hereinabove with reference to FIGS. 5A and 5B.

According to an alternative embodiment of the present invention, alternative structures of the blockage resistant water pathway as described hereinabove with reference to FIGS. 8A–10 may be employed.

It will be appreciated by persons skilled in the art that the present invention is not limited to what has been particularly shown and described hereinabove. Rather the scope of the present invention is defined only by the claims which follow:

What is claimed is:

1. Pressure responsive volume-controlled drip irrigation apparatus comprising:
    a drip irrigation element defining a volume control region having a peripheral edge surface along at least part of the periphery thereof and a side wall;
    a flexible membrane having an inner facing surface disposed along said side wall and an opposite surface communicating with a source of pressurized water, the volume control region being bounded by the side wall, the peripheral edge surface and the inner facing surface of the flexible membrane and defining a volume control region outlet at said peripheral edge surface and a volume control region inlet spaced from said volume control region outlet;
    a flow restricting pathway having a pathway inlet communicating with the source of pressurized water and a pathway outlet communicating with the volume control region at said volume control region inlet, and a water outlet communicating with the volume control region outlet, whereby water exiting the flow restricting pathway passes through the volume control region and exits via the water outlet and the location of the volume control region outlet at the peripheral edge surface prevents the volume control region outlet from becoming blocked by the flexible membrane when exposed to water pressures within the operating range of the drip irrigation apparatus.

2. Apparatus according to claim 1 and wherein said volume control region defines a water pathway from the volume control region inlet to the volume control region outlet which is not susceptible to blockage by the flexible membrane when exposed to water pressures within the operating range of the drip irrigation apparatus.

3. Apparatus according to the claim 2 and wherein said volume control region defines a channel extending generally but not necessarily completely between the volume control region inlet to the volume control region outlet.

4. Apparatus according to claim 2 and wherein said volume control region defines an elongate protrusion facing the flexible membrane and extending gneerally but not necessarily completely between the volume control region inlet to the volume control region outlet.

5. Apparatus according to claim 2 and wherein said volume control region outlet does not unerlie the flexible membrane insofar as it bounds the volume control region.

6. Apparatus according to claim 2 and wherein said volume control region outlet does not lie within the peripheral bounds of the region but rather outside thereof.

7. Apparatus according to claim 2 and wherein said flow restricting pathway is operative to significantly limit the flow through the dripper element to approximately the rated outflow rate thereof at all non-zero operating pressures below the rated operating pressure at which the volume control region is operative to control the volume.

8. Apparatus according to claim 1 and wherein said volume control region defines a channel extending generally but not necessarily completely between the volume control region inlet to the volume control region outlet.

9. Apparatus according to claim 1 and wherein said volume control region defines an elongate protrusion facing the flexible membrane and extending generally but not necessarily completely between the volume control region inlet to the volume control region outlet.

10. Apparatus according to claim 1 and wherein said volume control region outlet does not underlie the flexible membrane insofar as it bounds the volume control region.

11. Apparatus according to claim 1 and wherein said volume control region outlet does not lie within the peripheral bounds of the region but rather outside thereof.

12. Apparatus according to claim 1 and wherein said flow restricting pathway is operative to significantly limit the flow through the dripper element to approximately the rated outflow rate thereof at all non-zero operating pressure below the rated operating pressure at which the volume control region is operative to control the volume.

* * * * *